United States Patent [19]
Ito

[11] Patent Number: 5,403,143
[45] Date of Patent: Apr. 4, 1995

[54] AUTOMATIC GUIDED VEHICLE WITH MOVABLE HOOK UNIT

[75] Inventor: Michio Ito, Toyama, Japan

[73] Assignee: Sony Corporation, Tokyo, Japan

[21] Appl. No.: 229,305

[22] Filed: Apr. 18, 1994

[30] Foreign Application Priority Data

Apr. 16, 1993 [JP] Japan .................................. 5-089566

[51] Int. Cl.6 .............................................. B60P 1/00
[52] U.S. Cl. ................................ 414/469; 414/352; 414/498; 414/525.1
[58] Field of Search ............... 414/345, 352, 467, 469, 414/498, 507, 525.1, 539, 679, 544, 563, 250, 661, 491, 497; 280/402

[56] References Cited

U.S. PATENT DOCUMENTS

| | | | |
|---|---|---|---|
| 3,021,795 | 2/1962 | Hayba et al. | 414/345 X |
| 3,486,642 | 12/1969 | Plefka et al. | 414/497 X |
| 4,016,989 | 4/1977 | Furnari | 414/679 X |
| 4,120,411 | 10/1978 | Johnson | 414/497 X |
| 4,595,210 | 6/1986 | Groeing | 414/491 X |
| 4,708,575 | 11/1987 | Farmer et al. | 414/497 X |
| 4,808,058 | 2/1989 | Carney et al. | 414/352 X |
| 4,955,777 | 9/1990 | Inesor | 414/563 X |
| 5,087,166 | 2/1992 | Honegger | 414/544 X |
| 5,112,183 | 5/1992 | Nusbaum et al. | 414/544 |
| 5,145,311 | 9/1992 | Salvucci | 414/345 X |

FOREIGN PATENT DOCUMENTS

| | | | |
|---|---|---|---|
| 314176 | 5/1989 | European Pat. Off. | 414/539 |
| 3642561 | 6/1987 | Germany | 414/539 |

*Primary Examiner*—David A. Bucci
*Attorney, Agent, or Firm*—Hill, Steadman & Simpson

[57] ABSTRACT

An automatic guided vehicle is devoid of a floor and includes a substantially C-shaped body defining a space surrounded or closed from three directions including forward and backward directions of the vehicle, two hook units disposed side by side at a bottom portion of the space and each having one hook horizontally movable back and forth in a direction perpendicular to a longitudinal axis of the vehicle body, and an actuating unit disposed on a portion of the vehicle body for engaging and disengaging the hook and a carriage. The vehicle thus constructed is able to transfer the carriage and a freight within a small or limited space, thus reducing the transportation cost and the time of freight transfer operation.

3 Claims, 7 Drawing Sheets

AUTOMATIC GUIDED VEHICLE WITH MOVABLE HOOK UNIT

BACKGROUND OF THE INVENTION

1. Field of the Invention

The present invention relates to an automatic guided vehicle that can automatically move between a freight transfer station and a freight loading station on the floor of a factory, warehouse or the like. More particularly, this invention relates to such an automatic guided vehicle which is capable of automatically performing loading and unloading operation of a carriage at predetermined positions on a running passage which is slightly larger in width than the vehicle width.

2. Description of the Prior Art

The most common freight-transport vehicle of the type having a freight transfer device for delivering freights is a forklift. The forklift of the type concerned is usually operated by an operator boarding thereon. In recent years, with the spread of unmanned or automatically operated transport vehicle, the freight transfer device has been automated. One example of such unmanned or automatic transport vehicle is called an automatic fork traverse (AFT). The AFT is operated to move, without an operator aboard, between a freight-stocker entrance and exit and a freight transfer station, for transporting a freight, and automatically perform loading and unloading operation by inserting and removing a fork from one side of a freight which is placed at a predetermined level.

The automatic transport vehicle described above is constructed to handle and transport the freight alone. Another known automatic transport vehicle is an automatic guided vehicle (AGV) that can automatically transfer a carriage either alone or together with a freight. The conventional AGVs are generally separated into a trailer type and a side-fork type depending on the system used therein for transporting the carriage.

In the trailer-type carriage transport system, the rear end of a vehicle body is coupled with the front end of a carriage or trailer via an automatic joint. Due to such joint structure, the behavior of the carriage being trailed is unstable, so the vehicle passage must be wide enough to provide a room for accommodating the irregular movement of the carriage. Furthermore, it is very difficult to transfer the carriage from the AGV to a transfer station. This difficulty is not the only technical problem to be solved but leads to a substantial increase in the cost of transportation.

The side-fork type carriage transport system requires a lift unit provided for hoisting a carriage and moving it with wheels of the carriage kept in a floating condition relative to the floor or the ground surface. The lift unit includes a lift mechanism which tends to increase the overall size of the lift unit due to the necessity of producing a desired power and providing a desired rigidity. Furthermore, the side-fork type requires a vehicle passage which is excessively larger in width than the vehicle width, in view of the occasions where the vehicle is to be turned to change the direction of movement to achieve a freight-transfer operation, and with a view to insure insertion and removal of the fork relative to the carriage. In addition, a sufficient vertical space must be provided to insure a lifting operation achieved when the carriage is transferred.

Among the conventional automatic transport vehicles described above, the AFT and the side-fork type AGV have a certain difficulty in reducing the overall size, require a vehicle passage which is excessively larger in width than the vehicle width, and further require a vertical space for ensuring the lifting operation. Thus, these automatic transport vehicles are defective in terms of cost and space.

On the other hand, the trailer-type AGV encounters a technical difficulty in transferring a carriage within a small space and should expect a substantial increase in the transportation cost.

SUMMARY OF THE INVENTION

It is, therefore, an object of the present invention to provide an automatic guided vehicle (AGV) which employs a carriage transport system for automatically transporting a carriage either alone or together with a freight or container, and which has structural features that make it possible to transfer the carriage and the freight within a small or limited space, and reduce the transportation cost and the time of freight transfer operation.

To attain the foregoing object, an automatic guided vehicle, provided in accordance with the present invention for automatically transferring a carriage either alone or together with a freight to a predetermined position, is devoid of a floor and comprises: a substantially C-shaped vehicle body defining a space for receiving the carriage and the freight therein, with the carriage and the freight surrounded by the C-shaped vehicle body from three directions including forward and backward directions of the vehicle; at least one hook unit disposed at a bottom portion of the space and including a hook horizontally movable back and forth in a direction perpendicular to the longitudinal axis of the vehicle; and actuating means disposed on a portion of the vehicle body for locking and releasing the hook and the carriage.

Preferably, the hook unit includes a guide rod pivoted at one end to a portion of the vehicle body, a pair of belt-driving rollers supported on opposite ends of the guide rod, and an endless belt trained around the belt-driving rollers, the hook being attached to a portion of the endless belt. The actuating means preferably includes a rocking mechanism for vertically oscillating the guide rod about the pivoted one end thereof.

The automatic guided vehicle of the foregoing construction performs a sequence of operation described below. The automatic guided vehicle receives a loaded container and associated carriage at a predetermined position on a freight loading station, and after that it transports the loaded container and the carriage to a freight transfer station. At a predetermined position of the freight transfer station, the loaded container supported on the carriage is transferred from the automatic guided vehicle to an automatic fork traverse (AFT) which is standing by at the same predetermined position. When the container transfer operation completes, the automatic guided vehicle automatically moves to the predetermined position of the freight loading station to pick up the next loaded container.

The automatic guided vehicle performs the loading and unloading operations in a manner described below.

The automatic guided vehicle, departed from the freight loading station with the loaded container and the carriage held in the space of the vehicle body, is brought to a freight transfer station with its open side facing toward the freight transfer station.

Up to the time when the automatic guided vehicle is stopped at the freight transfer station, the hook is locked in its fully retracted position and held in locking engagement with the carriage. When the vehicle is stopped, the endless belt is rotated in one direction to advance the hook along the guide rod toward the front end of the guide rod. In this instance, the carriage is caught by the hook, so that as the hook advances, the carriage and the container are gradually forced out from the vehicle body. At this time, the guide rod is held in a horizontal position.

When the hook arrives at the front end of the guide rod, the container and the carriage are completely forced out from the vehicle body. Then, a suitable drive means is activated to turn the front end of the guide rod in a downward direction until the hook is disengaged from the carriage. When the disengagement between the hook and the carriage is detected by a suitable detecting means, the endless belt is rotated in the opposite direction, thereby retracting the hook toward the rear end of the guide rod. When arrived at the fully retracted position, the hook is locked in position against displacement. In this instance, the guide rod is returned to the horizontal position.

When the foregoing operation completes, the unloaded automatic guided vehicle is brought to a predetermined position of the freight loading station where a container filled with a freight is standing by as it is supported on a carriage. When the automatic guided vehicle is stopped at the predetermined position and held in confrontation with the container, a locking force on the hook is released and, at the same time, the guide rod is turned downwardly about the pivot axis. Then, the endless belt is rotated to advance the hook toward the front end of the guide rod. With this advancing movement, a portion of the hook projecting from the front end of the guide rod is inserted into a space extending below the carriage on which the loaded container is supported.

When the hook while being advanced is inserted into the space, the front end of the hook may interfere with a frame of the carriage. However, if such interference takes place, a suitable torque limiter is operated to immediately stop movement of the hook. In order to determine whether the hook is reliably inserted to a predetermined position of the space extending below the carriage, an end extremity of the advancing movement of the hook is previously set, and an appropriate position detection switch, such as a limit switch, is disposed at a portion of the guide rod corresponding in positon to the end extremity of the advancing movement of the hook. With this arrangement, the hook is inserted under the carriage while maintaining a proper amount of overlap between the hook and the carriage.

When the hook is properly inserted under the carriage, the front end of the guide rod is moved upwardly to engage the hook with the frame of the carriage. While keeping such engaging condition, the hook is retracted to pull the carriage and the container into the space in the vehicle body. When the pulling operation completes, the hook is locked in position against displacement. Then, the automatic guided vehicle automatically moves to the predetermined position of the freight transfer station while holding the loaded container and the carriage in the space in the vehicle body. Thereafter, the foregoing cycle of operation is repeated.

The above and other objects, features and advantages of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION

Figure 7:
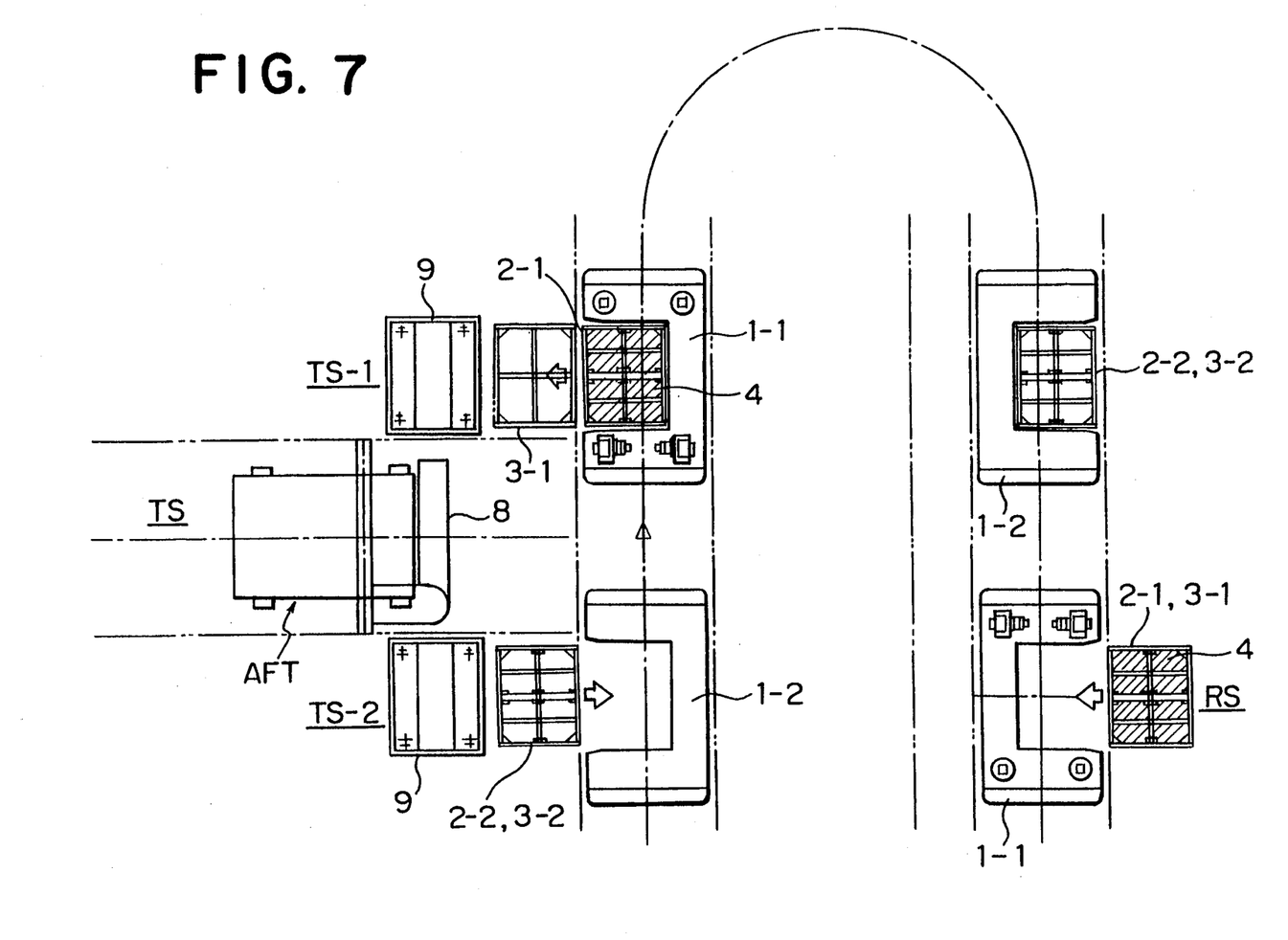
FIG. 7 is a diagrammatical plan view showing a sequence of operation of the automatic guided vehicle achieved when the vehicle moves between a freight transfer station and a freight loading station.
Figure 8:
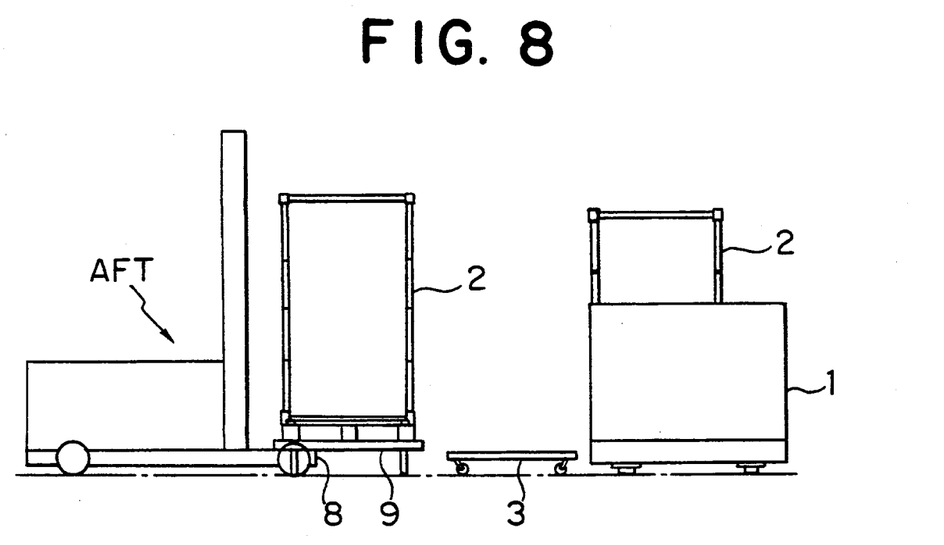
FIG. 8 is a diagrammatical front elevational view showing the manner in which a container is transferred from a carriage which has been delivered to the freight transfer station by the automatic guided vehicle.
Figure 9A:
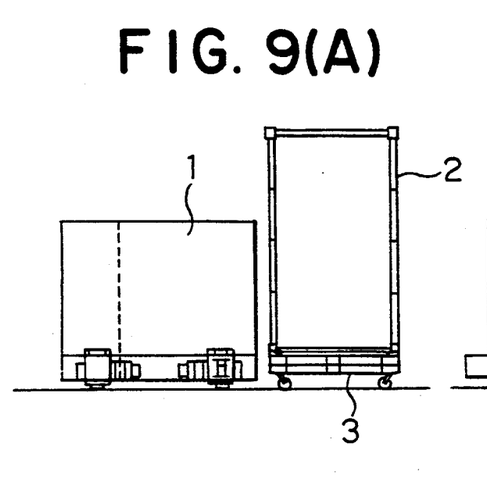
FIGS. 9(A) and 9(B), respectively, are a front elevational view and a side view that show the positional relationship between a container supported on a carriage at the freight loading station and the automatic guided vehicle.
Figure 9B:
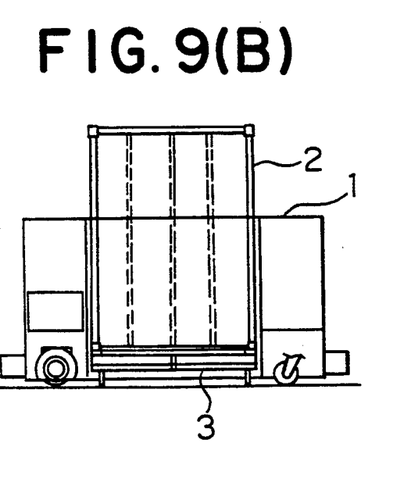

FIGS. 7 through 9 show a preferred embodiment of the present invention in which two identical, automatic guided vehicles 1-1 and 1-2 are arranged to run one after another. The second automatic guided vehicle 1-2 first draws into its predetermined position an empty container 2-2 and a carriage 3-2 which have been delivered to a predetermined position of a freight transfer station TS, then transports, without an operator aboard, the empty container 2-2 and the carriage 3-2 to a predetermined position of a freight loading station RS where products are collected for loading, subsequently places the carriage 3-2 on a predetermined portion of the freight loading station RS with the empty container 2-2 carried on the carriage 3-2, and finally returns to the above-mentioned predetermined position of the freight transfer station TS. During that time, the first automatic guided vehicle 1-1 first draws thereinto a container 2-1 which is charged or loaded with a freight 4 and is carried on a carriage 3-1 at a predetermined position of the freight loading station RS, and then transports, without an operator aboard, the loaded container 2-1 and the carriage 3-1 to the freight transfer station TS where the container 2-1 and the carriage 3-1 are unloaded from the automatic guided vehicle 1-1. Subsequently, the container 2-1 is transferred from the carriage 3-1 to another transport means, while the carriage 3-1 is left at the previous position. The transport means is provided at the freight transfer station TS for loading an empty container 2-2 on the carriage 3-2 and transporting, without an operator aboard, the container 2-1 and the freight 4 therein to a freight entrance and exit (not shown).

In brief, the automatic guided vehicles 1-1, 1-2 are characterized by the following features. At first, the automatic guided vehicles (only one shown in FIGS. 1-4 and generally indicated by the numeral 1 shown in FIG. 2) are devoid of a floor. Secondary, the vehicle body 10 on which a usual self-propelling unit is mounted has a substantially C-shaped configuration and defines a substantially rectangular space 11 for receiving therein a package freight 4 (FIG. 7) with the freight 4 surrounded by the C-shaped vehicle body 10 from three directions including forward and backward directions of the vehicle 1. A third feature is that at least one hook unit 5 is disposed at a bottom portion of the space 11 and includes a hook 50 horizontally movable back and forth in a direction perpendicular to the longitudinal axis of the automatic guided vehicle 1. A fourth or the last feature resides in that an actuating means 6 is disposed on a portion of the vehicle body 10 for engaging and disengaging the hook unit 5 relative to a carriage 3 (FIG. 7).

Stated more specifically, the vehicle body 10 has a substantially C-shape in horizontal cross-section and is devoid of a floor. Thus, the C-shaped vehicle body 10 has three sidewalls 12, 13 and 14 disposed respectively at the front, rear and right side of the vehicle body 10. The sidewalls 12-14 have a hollow structure and each has an internal space. The internal spaces receive therein an electric drive motor, an alarm device, and an emergency shutdown device (neither shown) that are installed in the same manner as the usual automatic guided vehicle. A battery, various electric devices and wirings (neither shown) are also received in the internal spaces of the hollow sidewalls 12-14. In addition, an actuating motor 61, a first cylinder 62, a second cylinder 63, a rocking bracket 64, a drive pulley 65, a drive belt 66, a driven pulley 67 and a driven belt 68 are disposed in the internal space of the right sidewall 14 for actuating various components of the hook unit 5.

The rocking bracket 64 is fixedly mounted on a support shaft 7 disposed near a presser roller 69 (FIG. 4) which is provided for exerting a proper tension on the driven belt 68 extending between the driven pulley 67 and a belt-driving pulley 56 (FIG. 4) coaxially attached to a belt-driving roller 52. The support shaft 7 is journaled on a bearing unit 71 vertically mounted on a frame (not shown) of the vehicle body, as shown in FIG. 5. An upper end of the rocking bracket 64 is connected to one end of a tension spring 72, the opposite end of the tension spring 72 being connected to the frame of the vehicle body 10. The tension spring 72 urges the rocking bracket 64 to turn clockwise in FIG. 4 about an axis of the support shaft 7 against the weight of the hook unit 5 which acts in a direction to turn the rocking bracket 64 in the counterclockwise direction about the axis of the support shaft 7. Thus, the rocking bracket 64 is held in a certain balanced condition by the force of the tension spring 72.

Figure 4:
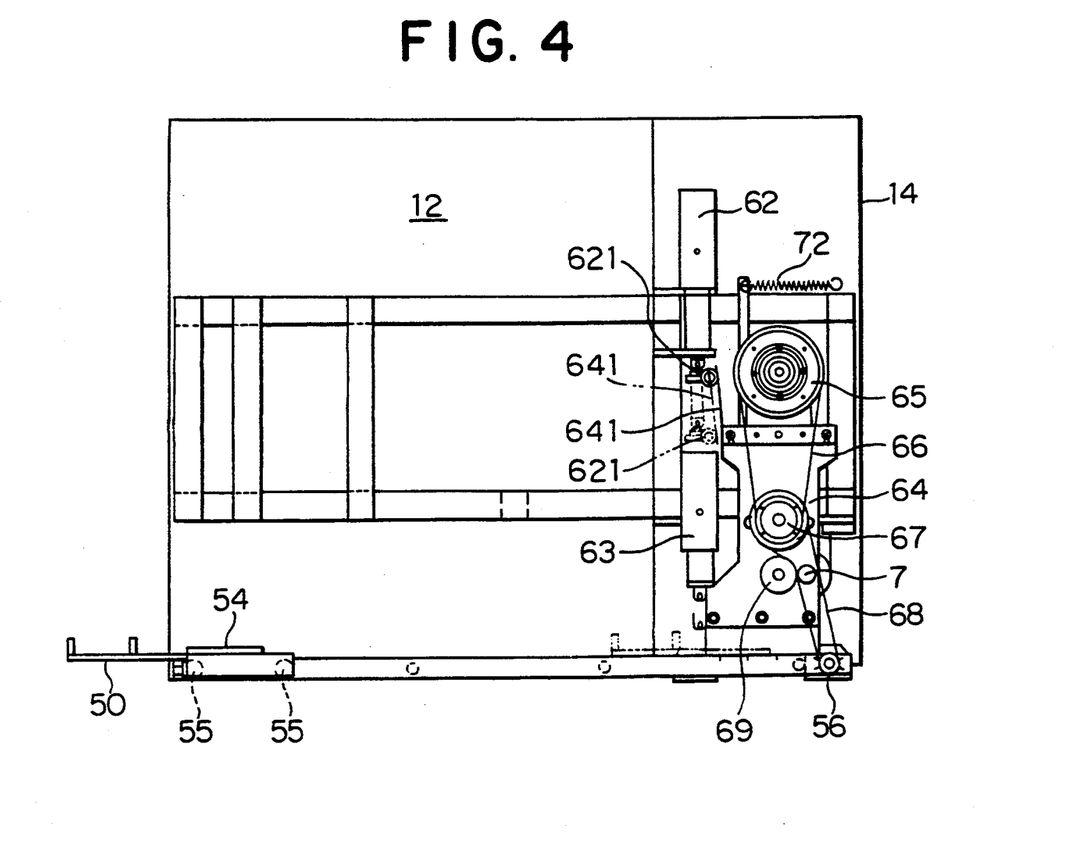
FIG. 4 is a side view of FIG. 3.
Figure 5:
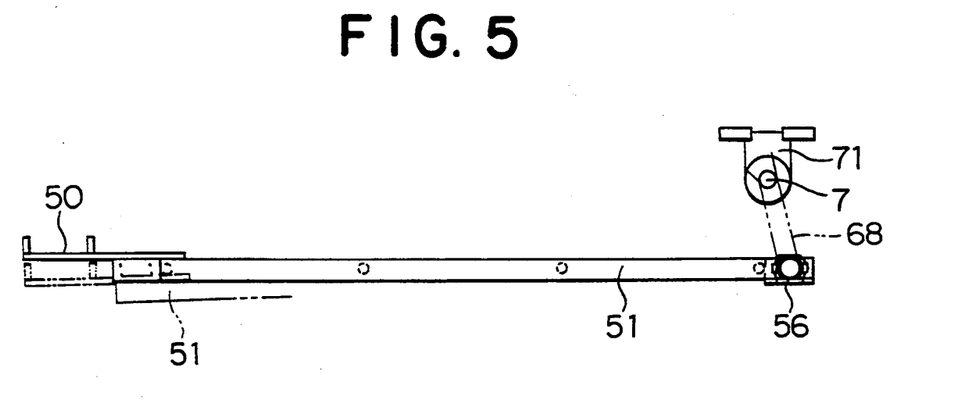
FIG. 5 is a diagrammatical side view illustrative of the operation of a rocking mechanism associated with the hook unit.

As shown in FIG. 4, the upper front end portion of the rocking bracket 64 has a vertically sloped surface 641 configured such that when the first cylinder 62 is in the deactivated state (or fully retracted), the hook unit 5 is held in a horizontal position, and when the first cylinder 62 is activated (or fully extended), a roller actuator 621 mounted on an outer end of the piston rod rolls down along the sloped surface 641 of the rocking bracket 64, thereby permitting the bracket 64 to turn in the counterclockwise direction by the weight of the hook unit 5. The second cylinder 63 has a function to lock the hook 50 in position against displacement, as described later.

Figure 1:
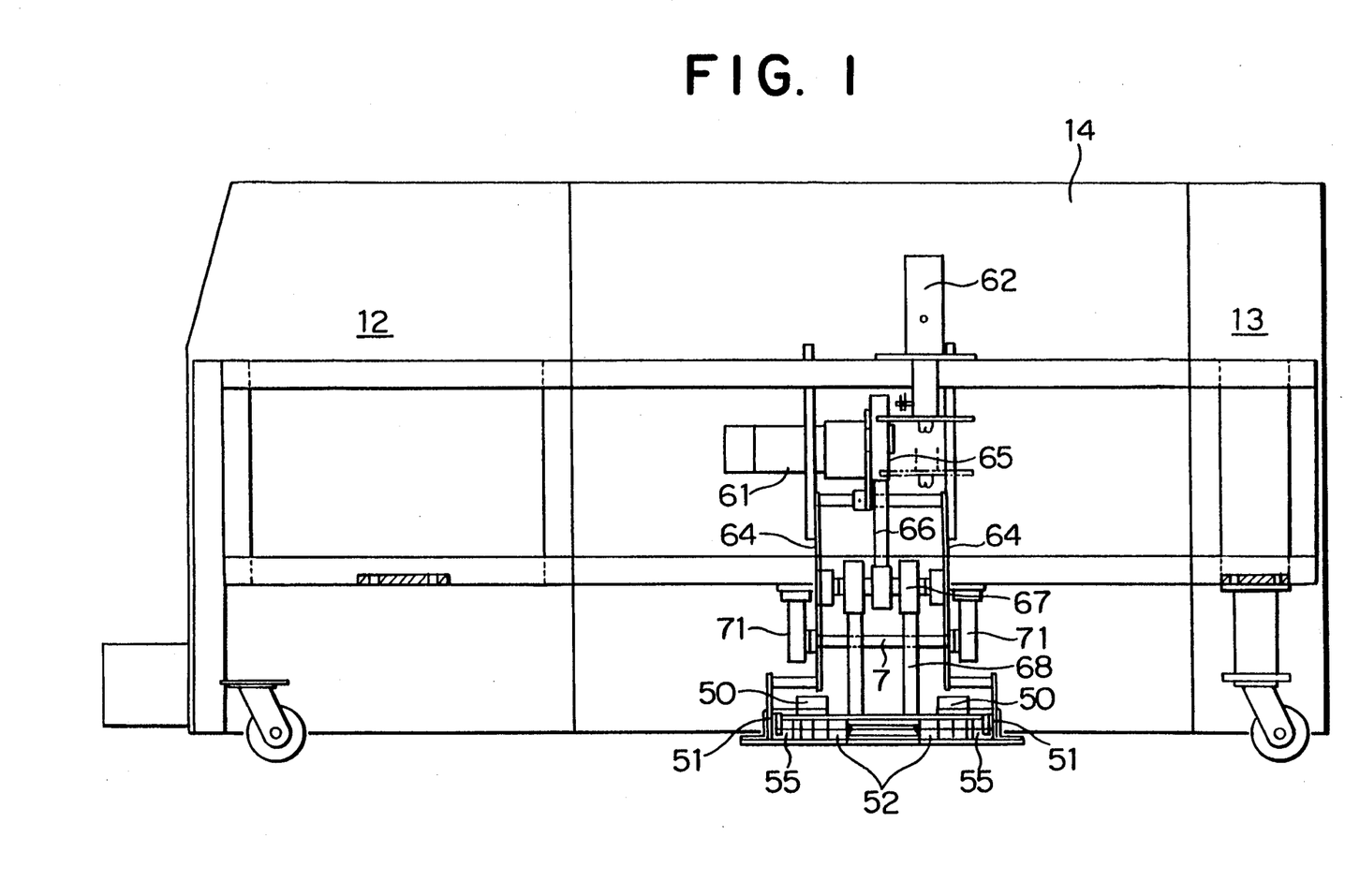
FIG. 1 is a schematic front elevational view, with parts cutaway for clarity showing a structure, of an automatic guided vehicle according to the present invention.
Figure 2:
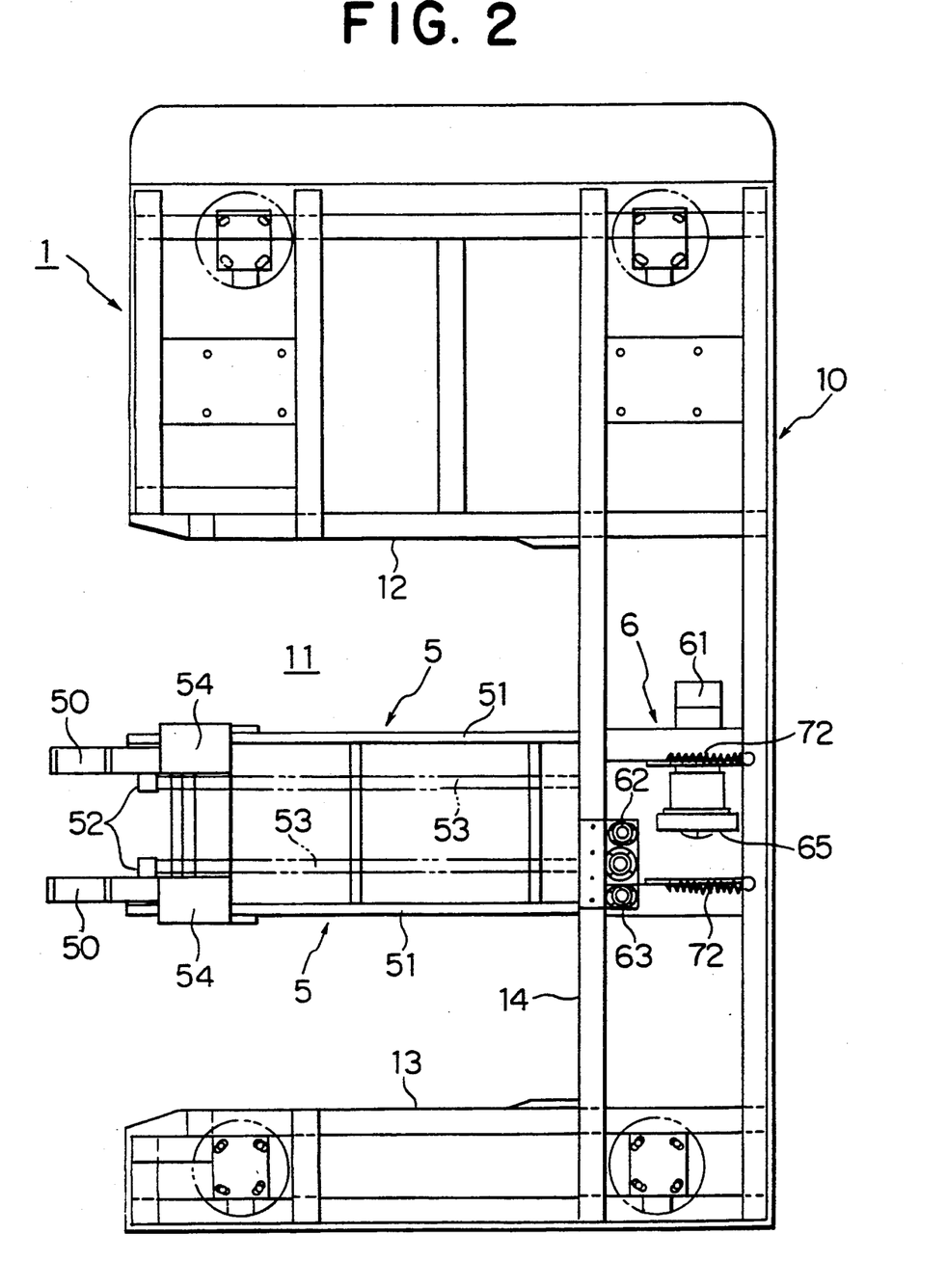
FIG. 2 is a schematic horizontal cross sectional view of the automatic guided vehicle.
Figure 3:
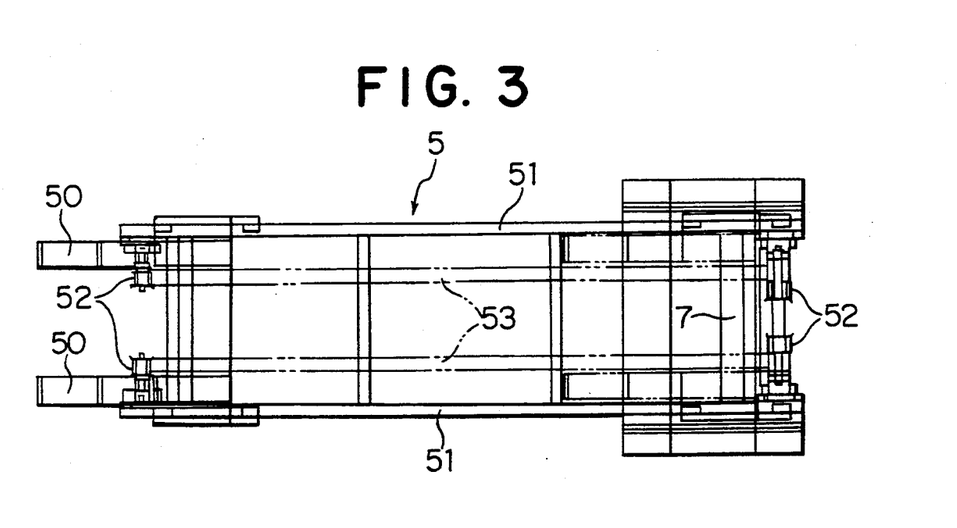
FIG. 3 is a schematic plan view showing a hook unit and a hook actuating mechanism of the automatic guided vehicle.

The number of the hook unit 5 described above is two and two hook units are arranged in parallel juxtaposition, as shown in FIG. 2, and operatively linked with each other. By using two juxtaposed hook units 5, the operational reliability of the hook units 5 can be increased. Each of the hook units 5 includes a guide rod 51 connected at one end to the lower end of the rocking bracket 64 and substantially horizontally projecting from the rocking bracket 64 into the space 11 of the vehicle body 10. A pair of belt-driving rollers 52 is disposed at opposite ends of the guide rod 51 and rotatably supported on an inner surface of the guide rod 51, as shown in FIG. 3. An endless belt 53 is trained around the belt-driving rollers 52, and a hook 50 is attached to a portion of an upper surface of the endless belt 53. The hook 50 is formed from a sheet metal and has a horizontal F-shape in vertical cross-section, as shown in FIGS. 3 and 4. The two (left and right) hooks 50, 50 are supported in parallel juxtaposition and joined by a connecting support member 54. The connecting support member 54 is in the shape of a rectangular plate and has four rollers 55 mounted at respective corners of the rectangular plate-like connecting support member 54. The connecting support member 54 is disposed astride the guide rods 51 with the rollers 55 supported on the guide rods 51. The connecting support member 54 has portions secured to corresponding portions of the left and right endless belts 53, 53.

One of the belt-driving rollers 52 which is disposed adjacent the corresponding rocking bracket 64 is rotated in the forward and reverse directions to complete a predetermined number of rotations when it is driven by the actuating motor 61 via the pulley 56, the driven belt 68, the driven pulley 67, the drive belt 66 and the drive pulley 65. In response to the rotation of the roller 52, the endless belt 53 runs in the forward and reverse directions to reciprocate the hook 50 along the guide rod 51 between a front end and the rear end of the guide rod 51.

The actuating motor 61 is provided with a torque limiter (not shown). The torque limiter is constructed to detect an abrupt change in torque caused due, for example, to overload on the actuating motor 61 when the hook 50 is pressed against a frame of the carriage 3, and actuate a switch to stop rotation of the actuating motor 61 upon detection of the torque change.

For this purpose, various torque limiters can be used without substantive limitations about their types of operation. However, a torque limiter adapted to be operated either by a mechanical means or by an electric means is preferable. The mechanical means comprises a cam which is assembled with an output shaft of the actuating motor 61 to rotate in synchronism with the rotation of the output shaft of the actuating motor 61. When the actuating motor 61 is overloaded, or in a condition where an abrupt torque change takes place, the cam is disengaged from the output shaft of the actuating motor 61 and, at the same time, activates a limit switch to stop rotation of the actuating motor 61. The electric means is arranged to detect an abrupt change in voltage or current caused due to overloading and to stop rotation of the actuating motor 61. The mechanical type torque limiter is reliable in operation and easy to maintain, is operative without a particular control device and, hence, can be constructed compactly with low production cost. Faking these advantages into account, the mechanical type torque limiter is further preferable over the electric type torque limiter.

Operation of the automatic guided vehicle 1 will be described below with reference to FIGS. 7 through 9. In the embodiment shown in FIGS. 7–9, two such automatic guided vehicles 1 are used. These automatic guided vehicles 1-1, 1-2 are circulatory movable between a freight transfer station TS and a freight loading station RS. The freight loading station RS is composed of a number of tape weaving machines disposed side by side. The first automatic guided vehicle 1-1 is used exclusively for the transportation of loaded containers 2-1 which are charged with a freight, while the second automatic guided vehicle 1-2 is used exclusively for the transportation of empty containers 2-2 which are free of freight. After the loaded container 2-1 is taken out from a position on the freight loading station RS by the first automatic guided vehicle 1-1, the empty container is placed on the same position on the freight loading station RS by the second automatic guided vehicle 1-2. Thus, by using the two identical automatic guided vehicles 1-1, 1-2, it becomes possible to exchange the freight efficiently at the same position on the freight loading station RS.

According to the embodiment previously mentioned, the first automatic guided vehicle 1-1 receives a loaded container 2-1 and associated carriage 3-1 at a predetermined position on the freight loading station RS and then transports the loaded container 2-1 and the carriage 3-1 to the freight transfer station TS. At a first predetermined position TS-1 of the freight transfer station TS, the loaded container 2-1 carried on the carriage 3-1 is transferred from the first automatic guided vehicle 1-1 to an automatic fork traverse (AFT) which is standing by at the position TS-1. When the loaded container 2-1 is fully transferred to the AFT, the first automatic guided vehicle 1-1 automatically moves to the predetermined position on the freight loading station RS to pick up the next loaded container 2-1.

On the other hand, the second automatic guided vehicle 1-2 automatically runs after the first automatic guide vehicle 1-1. At a second predetermined position TS-2 of the freight transfer station TS, the second automatic guided vehicle 1-2 receives an empty container 2-1 together with a carriage 3-2 on which the empty container 2-1 is supported. Thereafter, the second automatic guided vehicle 1-2 automatically goes to the position at which the loaded container 2-1 just taken out by the first automatic guided vehicle 1-1 was placed. At this position, the empty container 2-2 and the carriage 3-2 are taken off from the second automatic guided vehicle 1-2.

The automatic fork traverse (AFT) includes, as shown in FIG. 7, an L-shaped fork 8 disposed at the front side of a vehicle body. The fork 8 is transversely inserted under the container 2 or an exclusive carriage 9. The AFT is also provided with a drive mechanism (not shown) for rising and lowering the fork 8. The AFT thus constructed automatically shuttles between the non-illustrated freight entrance or exit and the freight transfer station TS.

Referring now to FIGS. 1, 3 and 6 through 9, a description will be given of a manner in which the carriage 3 is taken in and out by the automatic guided vehicle 1.

As shown in FIG. 7, the first automatic guided vehicle 1-1, departed from the freight loading station RS with the loaded container 2-1 and the carriage 3-1 held in the space 11 of the vehicle body 10, is brought to the first predetermined position TS-1 with its open side facing toward the freight transfer station TS. The first automatic guided vehicle 1-1 runs without an operator aboard and is stopped at the predetermined position when the vehicle 1-1 is detected by a photoelectric sensor (not shown) disposed at an appropriate position on the freight transfer station TS.

Up to the time when the first automatic guided vehicle 1-1 is stopped, the hooks 50 are disposed in their fully retracted positions and held in locking engagement with the carriage 3-1, the actuating motor 61 is stopped, and the second cylinder 63 is continuously activated to lock the hooks 50 in position against displacement. When the first automatic guided vehicle 1-1 is stopped, the second cylinder 63 is deactivated and the actuating motor 61 is energized whereupon these belt-driving rollers 52 which are located near the corresponding rocking brackets 64 are rotated counterclockwise in FIG. 4. The counterclockwise rotation of the belt-driving rollers 52 causes the endless belts 53 to run in the same direction, so that the hooks 50 are displaced toward the front ends of the respective guide rods 51. In this instance, since the carriage 3-1 is engaged by the hooks 50, the carriage 3-1 and the container 2-1 are gradually forced out from the vehicle body 10 as the hooks 50 advance. During that time, the first cylinder 62 is deactivated so that the guide rods 51 are held in a horizontal position.

When the hooks 50 arrive at the front ends of the respective guide rods 51, the container 2-1 and the carriage 3-1 are completely forced outside the vehicle body 10. Then, the first cylinder 62 is activated whereupon the roller actuator 621 (FIG. 4) on the outside end of the piston rod of the first cylinder 62 rolls down along the sloped surface 641 (FIG. 4) of one rocking bracket 64 (right bracket shown in FIG. 1). With this downward movement of the roller actuator 621, the rocking brackets 64 are permitted to turn in the counterclockwise direction in FIG. 4 by the weight of the hook units 5. Thus, the guide rods 51 are tilted downwardly as indicated by the phantom line shown in FIG. 5. When the guide rods 51 are disposed in the phantom-lined tilted position, the hooks 50 are disengaged from the carriage 3-1. When the disengagement between the hooks 50 and the carriage 3-1 is detected by an appropriate detecting means (not shown), the first cylinder 62 starts returning to its deactivated position. At the same time, the hook 50 starts moving toward the rear end of the guide rods 51. In this instance, since the roller actuator 621 (FIG. 4) as it rolls up along the sloped surface 641 (FIG. 4) urges the rocking bracket 64 to turn clockwise in FIG. 4 until the guide rods 51 resume their horizontal posture. To accomplish the backward movement of the hooks 50, the actuating motor 61 is driven in the reverse direction, causing the endless belts 53 to run in the clockwise direction in FIG. 4. Thus, the hooks 50 are retracted to the rear ends of the respective guide rods 51. When the hooks 50 arrive at the rear ends of the guide rods 51, the second cylinder 63 is activated to lock the hooks 50 in position against displacement.

When the foregoing operation completes, the unloaded first automatic guided vehicle 1-1 is brought to a position located in front of the a predetermined tape weaving machine (not shown) installed in the freight loading station RS. At the freight loading station RS, a woven tape produced by the tape weaving machine is continuously supplied in a container 2-1 placed on the carriage 3-1 until the container 2-1 is filled with the woven tape. When the first automatic guided vehicle 1-1 is stopped at the predetermined position and held in confrontation with the tape weaving machine, the second cylinder 63 is deactivated again to release the hooks 50. At the same time, the first cylinder 62 is activated to turn the guide rods 51 counterclockwise in FIG. 4 about the support shaft 7 until the guide rods 51 assume the downwardly tilted position indicated by the phantom line shown in FIG. 5. Then, the actuating motor 61 is driven in the forward direction to advance the hooks 50 toward the front ends of the respective guide rods 51. When the hooks 50 are fully advanced, the respective front end portions of the hooks 50 project from the front ends of the guide rods 5 and, as indicated by the phantom lines in FIG. 6(A), they are inserted into a space extending below the carriage 3-1 on which the container 2-1 filled with the woven tape is supported.

Figure 6A:
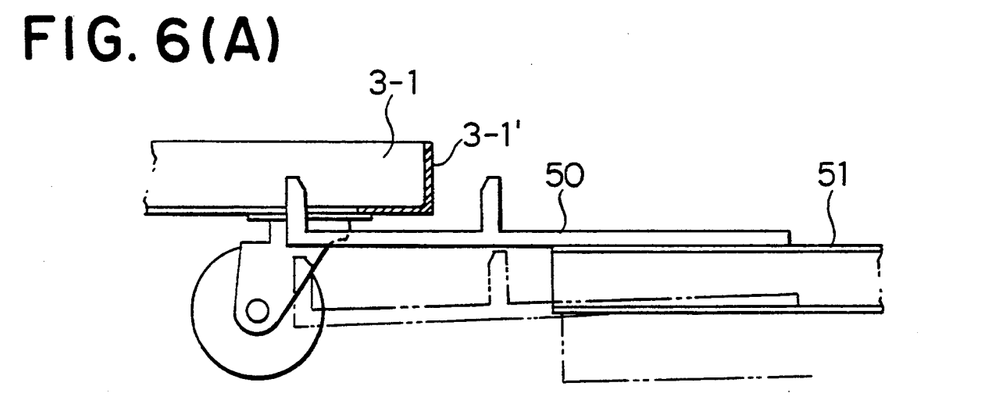
FIGS. 6(A)–6(C) are diagrammatical views showing the manner in which a carriage is engaged and disengaged with a hook on the hook unit and is displaced into and out of the space in the vehicle.
Figure 6B:
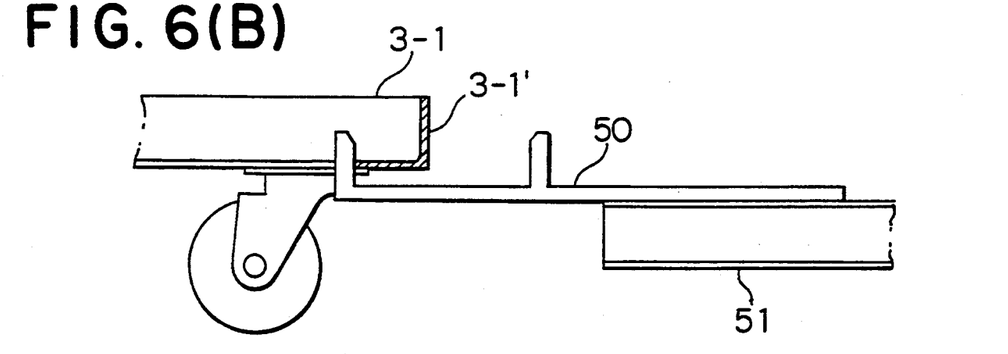
Figure 6C:
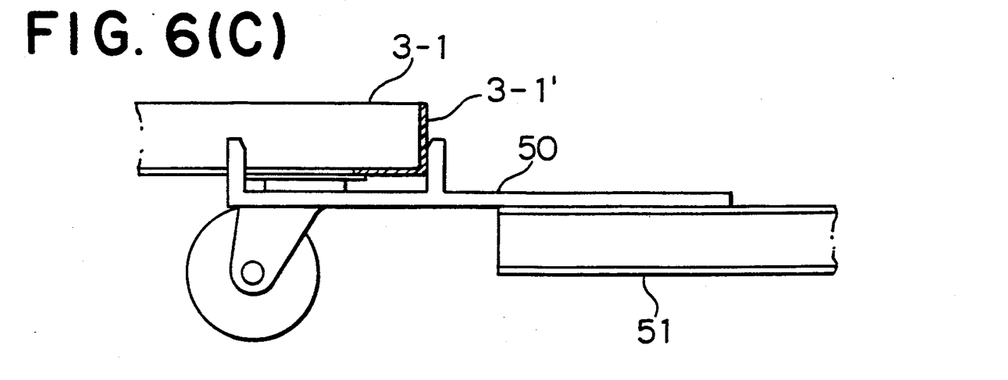

When the hooks 50 are advanced under the carriage 3-1, the front ends of the hooks 50 may interfere with a frame 3-1' of the carriage 3-1. However, if such interference takes place, the torque limiter (not shown) associated with the actuating motor 61 operates and immediately stops rotation of the actuating rotor 61. In order to determine whether the hooks 50 are reliably inserted to a predetermined position of the space extending below the carriage 3-1, an end extremity of the advancing movement of the hooks 50 is previously set. An appropriate position detection switch such as a limit switch (not shown) is disposed at a portion of one guide rod 51 corresponding in position to the end extremity of the advancing movement of the hooks 50. The limit switch is electrically connected to the actuating motor 61 and stops rotation of the actuating motor 61 when the end extremity of the advancing movement of the hooks 50 is detected by the limit switch. With the limit switch thus provided, the hooks 50 are inserted under the carriage 3-1 in such a manner that a proper amount of overlap between the hooks 50 and the carriage 3-1 is always maintained. FIG. 6(A) shows a position of the hooks 50 when they are properly inserted into the carriage 3-1. FIG. 6(B) illustrates a condition in which the carriage 3-1 is engaged with the hooks 50 and pulled into the space 11 (FIG. 1) of the vehicle body 10 as the hooks 50 are retracted. And, FIG. 6(C) shows a condition in which the carriage 3-1 is pushed out from the space 11 of the vehicle body 10 as the hooks 50 are advanced. It will be understood from FIGS. 6(A) through 6(C) that in order to insert the hooks 50 into carriage 3-1 while keeping a proper amount of overlap therebetween, the fully advanced position of the hooks 50 should be maintained within the range defined between the position shown in FIG. 6(B) and the position shown in FIG. 6(C).

When the hooks 50 are properly inserted under the carriage 3-1, the first cylinder 62 is deactivated again to turn the rocking brackets 64 clockwise in FIG. 4 in the manner as described above. With this angular movement of the rocking brackets 64, the hooks 50 are inserted into the carriage 3-1, as indicated by the solid lines shown in FIG. 6(A). Then, the actuating motor 61 is driven to retract the hooks 50. With this retracting movement of the hooks 50, the hooks 50 are brought into engagement with the frame 3-1' of the carriage 3-1, as shown in FIG. 6(B). A further retracting movement of the hooks 50 pulls the carriage 3-1 and the loaded container 2-1 into the space 11 (FIG. 2) of the vehicle body 10. During that time, casters attached to the bottom of the carriage 3-1 continuously roll on the factory floor or the ground surface. When the carriage 3-1 and the loaded container 2-1 are fully received in the space 11 of the vehicle body 10, the second cylinder 63 is activated to lock the hooks 50 in position against displacement. Then, while holding the carriage 3-1 and the loaded container 2-1 held in the space 11 of the vehicle body 10, the first automatic guided vehicle 1-1 automatically moves to the first predetermined position TS-1 of the freight transfer station TS. Thereafter, the first automatic guided vehicle 1-1 repeats the foregoing cycle of operation.

The first automatic guided vehicle 1-1 is followed by the second automatic guided vehicle 1-2. Now, a sequence of operation of the second automatic guided vehicle 1-2 will be described below in brief.

In FIG. 7, the second automatic guided vehicle 1-2 places or set an empty container 2-2 and associated carriage 3-2 to the predetermined position located in front of the predetermined tape weaving machine installed in the freight loading station RS. Then, the unloaded second automatic guided vehicle 1-2 is brought to a second predetermined position TS-2 of the freight transfer station TS with its open side facing toward the freight transfer station TS. In this instance, the next empty container 2-2 is standing by at the second predetermined position TS-2 as it is supported on a carriage 3-2.

The hooks 50 are kept in a fully retracted position until the second automatic guided vehicle 1-2 is stopped at the second predetermined position TS-2. In this instance, the second cylinder 63 is kept in the activated condition so that the hooks 50 are locked in position against displacement. When the second automatic guided vehicle 1-2 is stopped at the second predetermined position TS-2, the second cylinder 63 is deactivated, and the first cylinder 62 is activated to move the front ends of the respective guide rods 51 in a vertical downward direction via the rocking brackets 64. Then, the actuating motor 61 is driven in a forward direction so that the endless belts 53 run in a direction to advance the hooks 50 along the guide rods 51 toward the front ends of the guide rods 51. With this advancing movement, the hooks 50 are inserted under the carriage 3-2 which is standing by at the second predetermined position TS-2. When the hooks 50 arrive at the predetermined advanced position, the operation of the actuating motor 61 is stopped.

When the hooks 50 are inserted under the carriage 3-2 as previously mentioned, the first cylinder 62 is deactivated to turn the guide rods 51 and the hooks 50 upwardly so that the hooks 50 are brought into engagement with a frame of the carriage 3-2. At the same time, the actuating motor 61 is driven in the reverse direction to retract the hooks 50. With this retracting movement of the hooks 50, the carriage 3-2 and the empty container 2-2 supported thereon are pulled into the space 11 (FIG. 2) of the vehicle body 10. When the pulling operation completes, the second automatic guided vehicle 1-2 again starts moving toward the predetermined position located in front of the predetermined tape weaving machine. At this time, the predetermined position is free of a container because the loaded container 2-1 has already been removed by the first automatic guided vehicle 1-1. The second automatic guided vehicle 1-2 is stopped at the predetermined position whereupon the second cylinder 63 is deactivated and the actuating motor 61 is driven in the forward direction to advance the hooks 50. With this advancing movement of the hooks 50, the empty container 2-2 and associated carriage 3-2 are forced out from the vehicle body 10 and set to the predetermined position located in front of the tape weaving machine.

When the empty container 2-2 and the carriage 3-2 are completely forced out, the actuating motor 61 is stopped. At the same time, the first cylinder 62 is activated to rotate the guide rods 51 with hooks 50 downwardly, so that the hooks 50 are disengaged from the carriage 3-2 to set the empty container 2-2 with the carriage 3-2 at the predetermined position in front of the weaving machine.

Then, the actuating motor 61 is driven in the reverse direction to retract the hooks 50, and the first cylinder 62 is deactivated to move the guide rods 51 back to the horizontal position. When the hooks 50 arrive at the fully retracted position, the second cylinder 63 is activated to lock the hooks 50 at this fully retracted position. Upon completion of the hook-locking operation, the unloaded, second automatic guided vehicle 1-2 moves to the second predetermined position TS-2 of the freight transfer station TS. Thereafter, the foregoing cycle of operation of the automatic guided vehicle 1-2 is repeated.

According to the embodiment previously mentioned, the body 10 of the automatic guided vehicle 1 has a substantially C-shape as viewed from the plane. However, the vehicle body 10 may have an inverted U-shape in side elevation provided that the operation of the automatic guided vehicle 1 is affected by the height of the freight 4. In this instance, the hook units 5 and the associated drive units are suspended from one side of the top wall of the vehicle body 10.

As is apparent from the foregoing description, by using two identical automatic guided vehicles 1 in pair, the freight 4 can be loaded and transferred efficiently and speedily.

The automatic guided vehicle 1 of the present invention is able to hold a freight 4 (container) and a carriage 3 in the space 11 of the vehicle body 10 with the freight 4 supported on the carriage 3, and transport the carriage 3 and the freight 4 in such a manner that the casters on the carriage 3 roll on the factory floor or the ground surface. The drive motor used for driving the automatic guided vehicle 1 is completely protected against overload. Furthermore, even if the freight partly projects from left and right sides of the vehicle body, loading-/unloading and transportation of the freight can be achieved satisfactorily when the automatic guided vehicle is used with the vehicle passage slightly larger in width than the vehicle width and also the freight width.

As previously mentioned in greater detail, according to the present invention, the vehicle body has a particular configuration which is devoid of a floor and defines a space for receiving a carriage and a freight (container). The vehicle body is provided with a hook member which is disposed at a bottom portion of the space and movable back and forth in a horizontal plane extending in a direction perpendicular to a longitudinal axis of the vehicle. With this construction, the loading and unloading operations can be achieved on a vehicle passage provided that the vehicle passage has a width large enough to permit the passage of the vehicle. In addition, during the transportation, the freight (or container) and the carriage are fully received in the space of the vehicle body, and casters on the carriage are kept in rolling contact with the factory floor or the ground surface. This makes it possible to use the space efficiently and lower the power consumption of the vehicle. Thus, the automatic guided vehicle of the present invention is highly efficient and economical.

Obviously, various minor changes and modifications of the present invention are possible in the light of the above teaching. It is therefore to be understood that within the scope of the appended claims the invention may be practiced otherwise than as specifically described.

What is claimed is:

1. An automatic guided vehicle for transporting a carriage either alone or together with a freight, said vehicle comprising:
    (a) a substantially C-shaped vehicle body defining a space for receiving the carriage and the freight therein, with the carriage and the freight surrounded by said C-shaped vehicle body from three directions including forward and backward directions of said vehicle;
    (b) at least one hook unit disposed at a bottom portion of said space and including a hook horizontally movable back and forth in a direction perpendicular to the longitudinal axis of said vehicle;
    (c) actuating means disposed on a portion of said vehicle body for locking and releasing said hook and the carriage; and
    wherein said vehicle is devoid of a floor.

2. An automatic guided vehicle according to claim 1, wherein said hook unit includes a guide rod pivoted at one end to a portion of said vehicle body, a pair of belt-driving rollers supported on opposite ends of said guide rod, and an endless belt trained around said belt-driving rollers, said hook being attached to a portion of said endless belt.

3. An automatic guided vehicle according to claim 2, wherein said actuating means includes a rocking mechanism for vertically oscillating said guide rod about said pivoted one end.

* * * * *

UNITED STATES PATENT AND TRADEMARK OFFICE
CERTIFICATE OF CORRECTION

PATENT NO. : 5,403,143
DATED : April 4, 1995
INVENTOR(S) : Michio Ito

It is certified that error appears in the above-indentified patent and that said Letters Patent is hereby corrected as shown below:

Title page, item ]73], Assignee: should read--YKK Corporation--.

Signed and Sealed this

Seventh Day of May, 1996

Attest:

BRUCE LEHMAN

Attesting Officer   Commissioner of Patents and Trademarks